(12) United States Patent
Jenkins

(10) Patent No.: US 10,338,699 B2
(45) Date of Patent: Jul. 2, 2019

(54) VARIABLE DENSITY DEVICE PROFILE

(71) Applicant: Microsoft Technology Licensing, LLC, Redmond, WA (US)

(72) Inventor: Kurt A. Jenkins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 331 days.

(21) Appl. No.: 14/751,038

(22) Filed: Jun. 25, 2015

(65) Prior Publication Data

US 2016/0378207 A1 Dec. 29, 2016

(51) Int. Cl.
| | |
|---|---|
| *G09G 5/00* | (2006.01) |
| *G06F 3/0354* | (2013.01) |
| *B29D 12/02* | (2006.01) |
| *B43K 8/00* | (2006.01) |
| *B43K 21/00* | (2006.01) |
| *B43K 23/008* | (2006.01) |
| *B43K 5/00* | (2006.01) |
| *B43K 7/00* | (2006.01) |
| *G02C 5/00* | (2006.01) |
| *G06F 1/16* | (2006.01) |
| *G06F 1/20* | (2006.01) |
| *D06N 7/00* | (2006.01) |
| *G02C 5/16* | (2006.01) |
| *G02C 11/08* | (2006.01) |

(52) U.S. Cl.
CPC ......... *G06F 3/03545* (2013.01); *B29D 12/02* (2013.01); *B43K 5/005* (2013.01); *B43K 7/005* (2013.01); *B43K 8/003* (2013.01); *B43K 21/006* (2013.01); *B43K 23/008* (2013.01); *D06N 7/00* (2013.01); *G02C 5/008* (2013.01); *G02C 5/16* (2013.01); *G02C 11/08* (2013.01); *G06F 1/1616* (2013.01); *G06F 1/203* (2013.01)

(58) Field of Classification Search
CPC ... G06F 3/03545; G06F 1/1698; G02C 7/083; G02C 11/10; G02F 1/1313; H04B 1/088; B43K 5/005
USPC .................................................. 345/179, 905
See application file for complete search history.

(56) References Cited

U.S. PATENT DOCUMENTS

| | | | | |
|---|---|---|---|---|
| 332,446 | A | * 12/1885 | Bell ...................... | B64D 35/00 192/93 A |
| 1,743,796 | A | * 1/1930 | Nelson .................... | G02C 5/00 351/111 |

(Continued)

FOREIGN PATENT DOCUMENTS

| | | |
|---|---|---|
| CN | 101046556 A | 10/2007 |
| CN | 201405597 Y | 2/2010 |

(Continued)

OTHER PUBLICATIONS

International Search Report and Written Opinion dated Jan. 2, 2017 from PCT Patent Application No. PCT/US2016/038856, 17 pages.

(Continued)

*Primary Examiner* — Jennifer T Nguyen
(74) *Attorney, Agent, or Firm* — Rainier Patents, P.S.

(57) ABSTRACT

The description relates to devices. One example device can involve a mesh structure with a density profile varying from a first end of the mesh structure to a second end of the mesh structure.

22 Claims, 7 Drawing Sheets

(56) References Cited

U.S. PATENT DOCUMENTS

| | | | |
|---|---|---|---|
| 4,139,281 A * | 2/1979 | Luttner | G02C 11/00 351/111 |
| 5,248,855 A | 9/1993 | Cambridge | |
| 5,898,427 A | 4/1999 | Okamoto | |
| D412,521 S * | 8/1999 | Jorst | D16/323 |
| 5,984,556 A * | 11/1999 | Gray | B43K 23/008 401/192 |
| 7,077,594 B1 | 7/2006 | Annerino et al. | |
| 7,785,027 B1 | 8/2010 | McKinley et al. | |
| 2002/0002395 A1 | 1/2002 | Berg et al. | |
| 2003/0062151 A1 | 4/2003 | Sauciuc et al. | |
| 2005/0219233 A1 | 10/2005 | Homer | |
| 2009/0050378 A1 | 2/2009 | Lee | |
| 2009/0251442 A1 | 10/2009 | Nakata | |
| 2012/0075258 A1 | 3/2012 | Leung | |
| 2012/0268428 A1 | 10/2012 | Nakata et al. | |
| 2013/0038579 A1 * | 2/2013 | Boyd | B43K 7/02 345/179 |
| 2013/0076998 A1 * | 3/2013 | Kakinuma | G02B 27/2264 349/13 |
| 2013/0135262 A1 * | 5/2013 | Alameh | G06F 3/0383 345/179 |
| 2014/0029195 A1 | 1/2014 | Barnes | |
| 2014/0062966 A1 | 3/2014 | Szymanski et al. | |
| 2014/0126148 A1 | 5/2014 | Xu | |
| 2014/0267180 A1 | 9/2014 | Buelow et al. | |
| 2014/0290193 A1 | 10/2014 | Wang | |
| 2015/0022464 A1 | 1/2015 | Schantz et al. | |
| 2015/0153851 A1 | 6/2015 | Knepper et al. | |
| 2015/0338933 A1 * | 11/2015 | Holz | G06F 3/03545 345/179 |

FOREIGN PATENT DOCUMENTS

| | | |
|---|---|---|
| CN | 104142580 A | 11/2014 |
| EP | 2405320 A2 | 1/2012 |
| EP | 2581780 A1 | 4/2013 |
| WO | 2015028965 A1 | 3/2015 |

OTHER PUBLICATIONS

Miller, Brian, "Which Stylus Should I Use? Part 2: Top 5 Rubber Tipped Stylus Pens", Published on: Dec. 22, 2012, Available at: <<http://masterdigitalcolor.com/2012/12/which-stylus-should-i-use-part-2-rubber-tipped-stylus-pens/>>, 6 pages.

Molitch-Hou, Michael, "Dragonbite 3D Printed Stylus Aids Pens in Digital Design", Published on Apr. 9, 2014, Available at: <<http://3dprintingindustry.com/2014/04/09/dragonbite-3d-printed-stylus/>>, 2 pages.

"Multi-Tool Tech Pen/Stylus", Retrieved on: Apr. 16, 2015, Available at: <<http://cdn.cnetcontent.com/2a/d5/2ad5932a-177a-42d9-b7aa-7af68b0f55e1.pdf>>, 1 pages.

Second Written Opinion dated Jun. 8, 2017 from PCT Patent Application No. PCT/US2016/038856, 11 pages.

Demand filed Apr. 21, 2017 with Response to the International Search Report and Written Opinion dated Jan. 2, 2017 from PCT Patent Application No. PCT/US2016/038856, 12 pages.

"International Preliminary Report on Patentability Issued in PCT Application No. PCT/US2016/038856", dated Sep. 6, 2017, 12 Pages.

"First Office Action and Search Report Issued in Chinese Patent Application No. 201680037251.4", dated Dec. 12, 2018, 15 Pages.

* cited by examiner

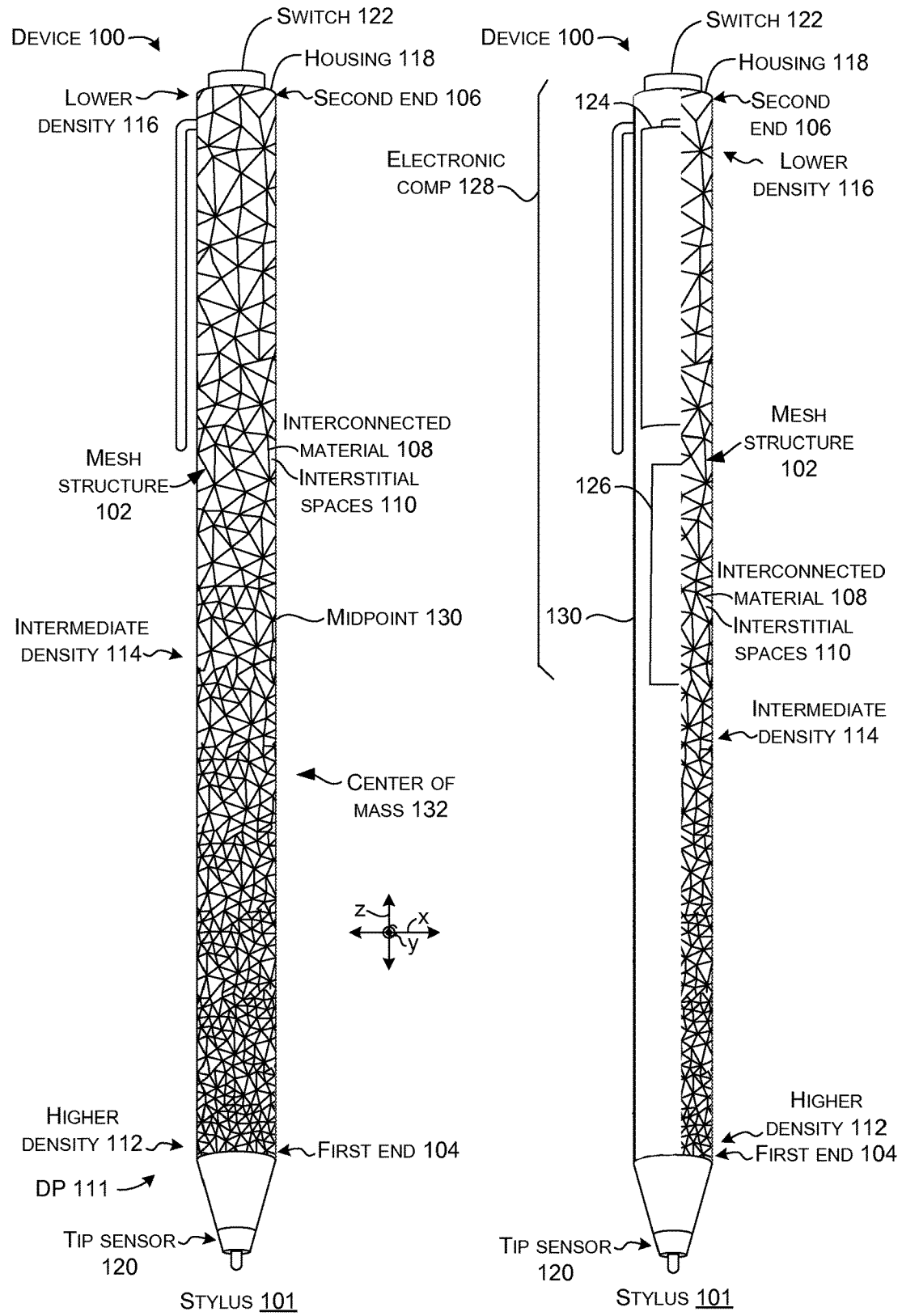

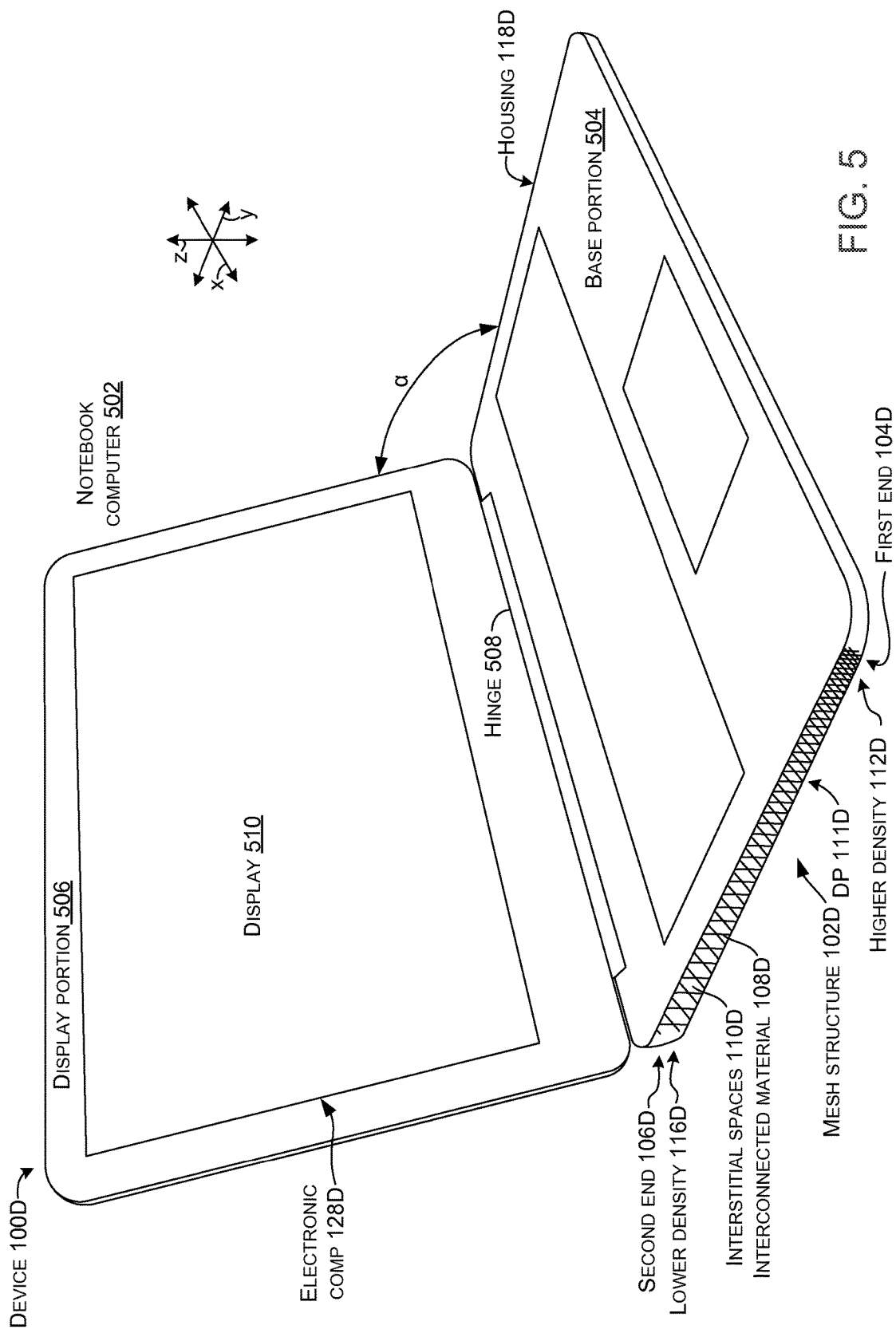

VARIABLE DENSITY DEVICE PROFILE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1A, 1B, 2A, 2B, 3, 4A, 4B, 6, and 7 show elevational views of example devices in accordance with some implementations of the present concepts.

FIG. 5 shows a perspective view of an example device in accordance with some implementations of the present concepts.

DESCRIPTION

Figure 2A:
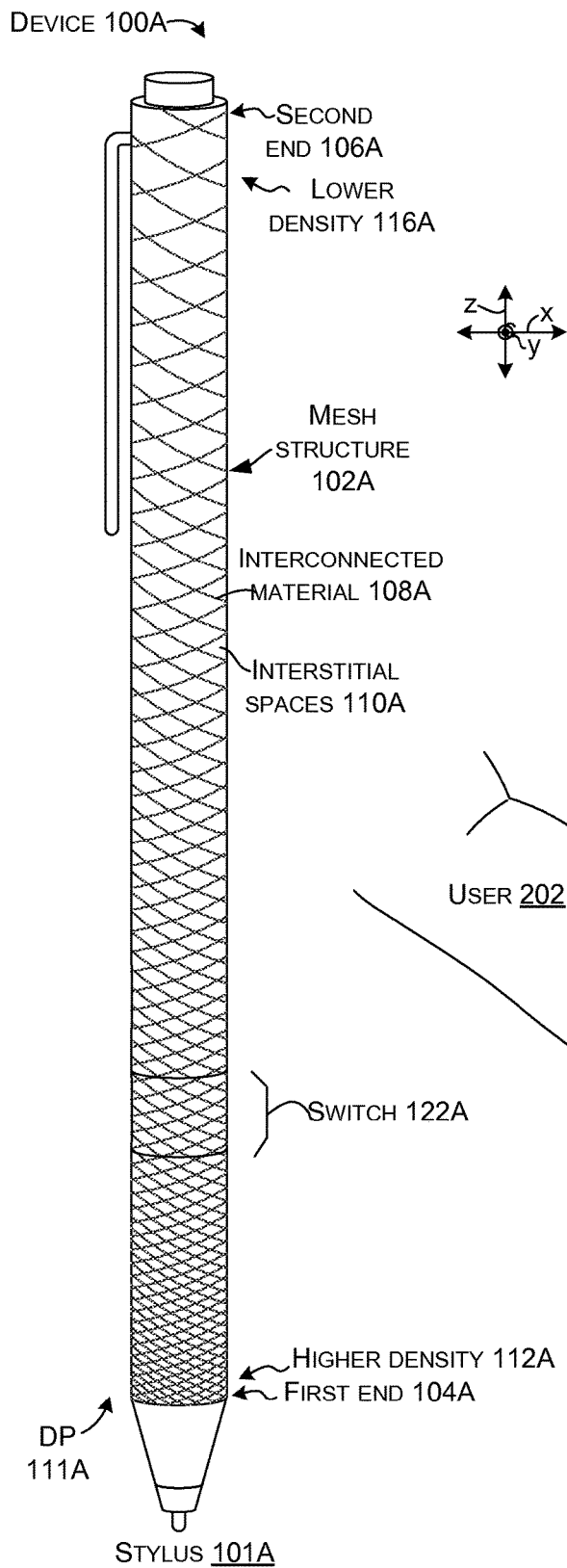

The present concepts relate to devices, such as computing devices, styluses, and/or wearables, among others. The devices can include a mesh structure. For instance, the mesh structure can be manifest as a component of the device, such as a housing or a portion of a housing of the device. The mesh structure can have a varying density profile. For instance, the density profile can vary from a first end of the mesh structure to a second end of the mesh structure. The variable density of the mesh structure can be leveraged in various ways, such as to influence a center of mass of the device.

FIGS. 1A and 1B collectively illustrate an example device 100 manifest as digital stylus 101. Device 100 can employ a variable density mesh structure (hereinafter, "mesh structure") 102. FIG. 1B shows a partial cut-away view of the device 100 to show underlying components. The mesh structure 102 can extend from a first end 104 to a second end 106. The mesh structure 102 can entail interconnected material 108 and intervening/interstitial spaces 110. A density profile 111 of the mesh structure can vary from higher density 112 to intermediate density 114 and lower density 116.

In this particular implementation the mesh structure 102 can function as a housing or body 118 of the device 100. In this case, the housing approximates a portion of an elongate tube. In this example, a tip sensor (e.g. sensing tip) 120 is positioned relative to the first end 104 of the mesh structure and a switch 122 is positioned relative to the second end 106. Visible in FIG. 1B, a battery 124, and a printed circuit board 126 can be positioned within the tube-shaped housing 118. The tip sensor 120, switch 122, battery 124, and/or printed circuit board 126 can be viewed as examples of electronic components 128 associated with the device 100.

In this case, the relative position of the electronic components 128, especially the battery 124, tends to be heavier toward the second end 106 and thus the device 100 would tend to have a center of mass toward the second end 106 (e.g., between a midpoint 130 and the second end 106). However, the variable density of the mesh structure with the higher density 112 toward the first end 104 and the lower density 116 toward the second end 106 can compensate for the electronic components and cause the device to have a neutral center of mass 132 (e.g., center of mass at the midpoint 130) or be weighted toward the first end 104. A traditional wooden pencil tends to have a center of mass toward the first end (writing or tip end), and the variable density of the mesh structure can allow the device 100 to mimic or simulate the 'feel' of the traditional wooden pencil.

Viewed from one perspective, the mesh structure 102 can vary from the first end 104 where the mesh structure achieves higher density by employing relatively more interconnected material 108 and relatively less and/or smaller interstitial spaces 110. This relative relationship can vary toward the second end 106 that achieves lower density 116 by increasing the size and/or number of interstitial spaces 110 and decreasing the amount of interconnected material 108.

The transition in the density profile 111 from relatively higher density to relatively lower density can be distinct, stepped, and/or continuously gradiated. For instance, an example of a distinct transition could be that a lower half of the interconnected material 108 starting at the first end 104 has a first higher density that transitions at a midpoint 130 of the device to a second lower density that continues to the second end 106. An example of a stepped configuration can involve, for instance, the first 25 percent of the mesh structure starting at the first end 104 to have a higher density, the next 25 percent to have a lower density, the next 25 percent to have even a lower density, and the last 25 percent terminating at the second end 106 having the lowest density. FIGS. 1A and 1B illustrate an example of the continuously gradiated configuration where the density profile 111 is highest at the first end 104 and lowest at the second end 106, but changes in the density are not readily apparent between the first and second ends.

Many different mesh structure 102 configurations can be employed in various implementations. Several mesh structure configurations are illustrated and discussed relative to the accompanying FIGS., but any mesh structure configuration can be employed that can vary the relative ratios of interconnected material 108 to interstitial spaces 110 to affect the density profile 111 of the mesh structure 102.

Figure 2B:
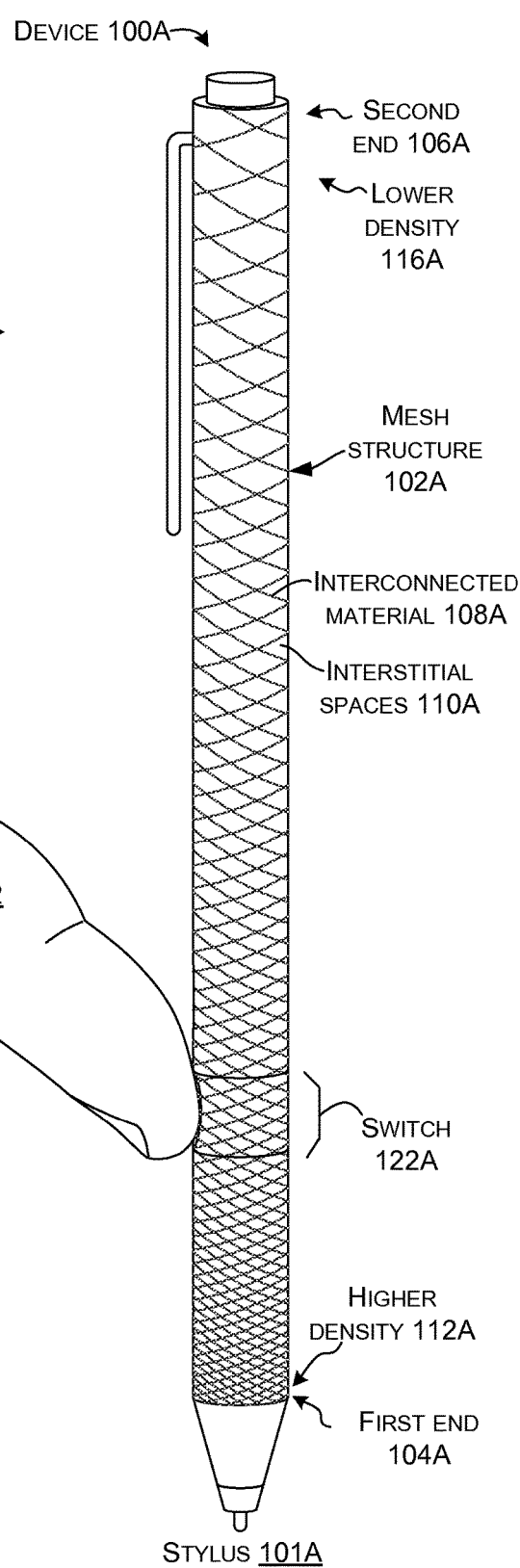

FIGS. 2A and 2B show another example device 100A manifest as digital stylus 101A employing mesh structure 102A. In this example, the mesh structure can achieve higher density 112A at the first end 104A and lower density 116A at the second end 106A by having more individual units of interconnected material 108A per unit area at the first end than the second end. Viewed another way, a pattern of the mesh structure is tighter at the first end and looser at the second end.

In this case, mesh structure 102A can be flexible so that portions of the mesh structure can be deflected by a user 202. For purposes of example, stylus 101A includes a pressure switch 122A positioned beneath the mesh structure 102A. In this case, the pressure switch extends radially around the stylus, but other shapes of pressure switches could be employed. As evidenced in FIG. 2B, the user 202 can press on the mesh structure 102A to deflect the mesh structure sufficiently to activate the underlying pressure switch 122A.

Figure 3:
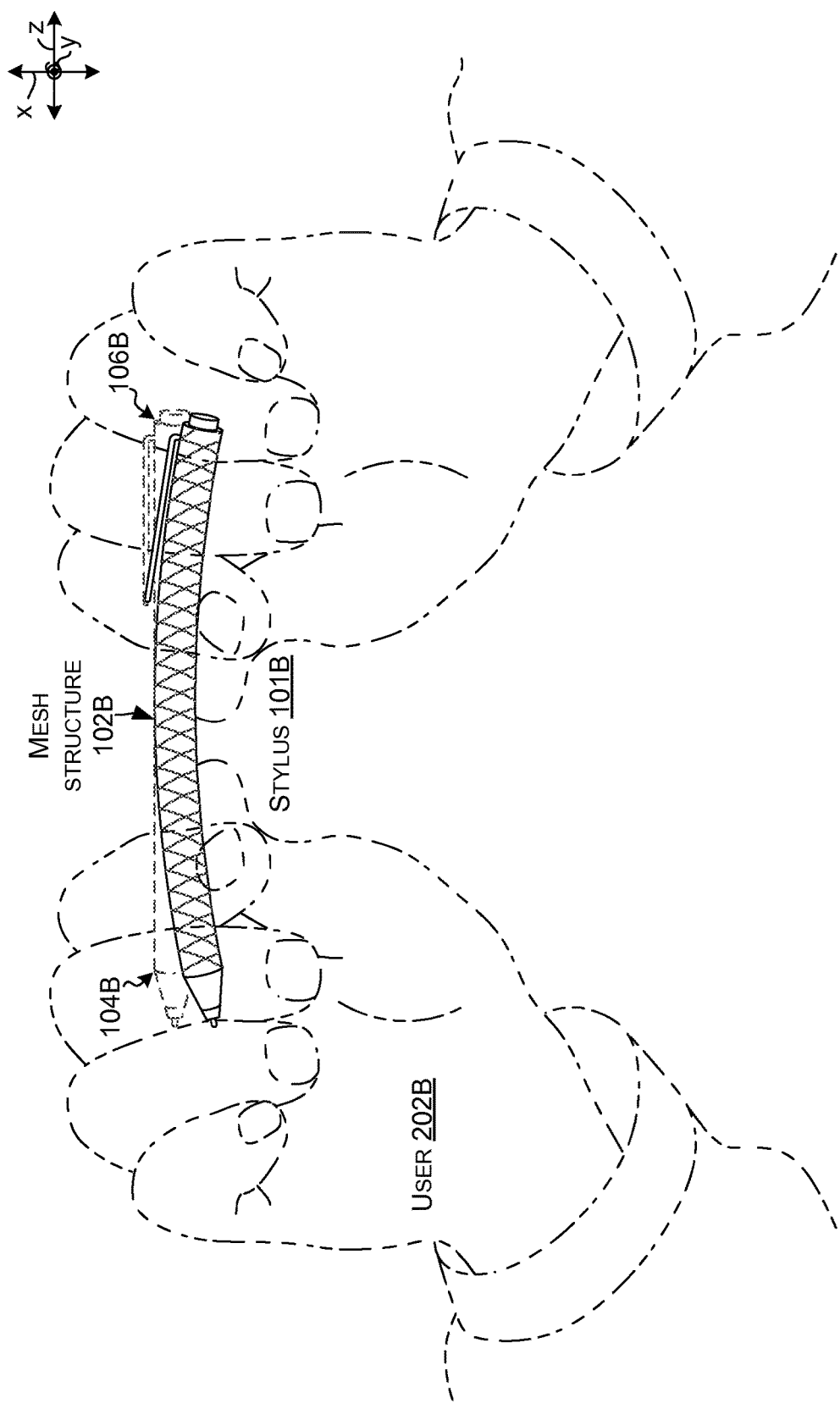

FIG. 3 shows another mesh structure 102B of digital stylus 101B. In this example, the mesh structure 102B is generally uniform along its length (along the z reference axis) from the first end 104B to the second end 106B. This uniform pattern can result in relatively uniform flexing or bending. In this case, the mesh structure is flexible over its length (e.g., along its length between the first end and the second end or along the z reference axis). Other implementations can vary the pattern of the mesh structure 102B along the length to cause the flexing pattern or shape to be non-uniform. For instance, relative to the mesh structure of FIG. 2, the mesh structure 102A may bend easier at the first end 104 and become stiffer toward the second end 106. The mesh structure can be selected to satisfy specific flexure specifications. For instance, the flex between the first end and the second end as measured by a three point test can be less than 5 Newtons, between 5 and 50 Newtons, or more than 50 Newtons of torsional force, for example. The tailorable flexure specification can allow the mesh structure 102B to mimic the flex patterns (e.g., feeling) of writing with a traditional wooden pencil.

Figures 4A, 4B:
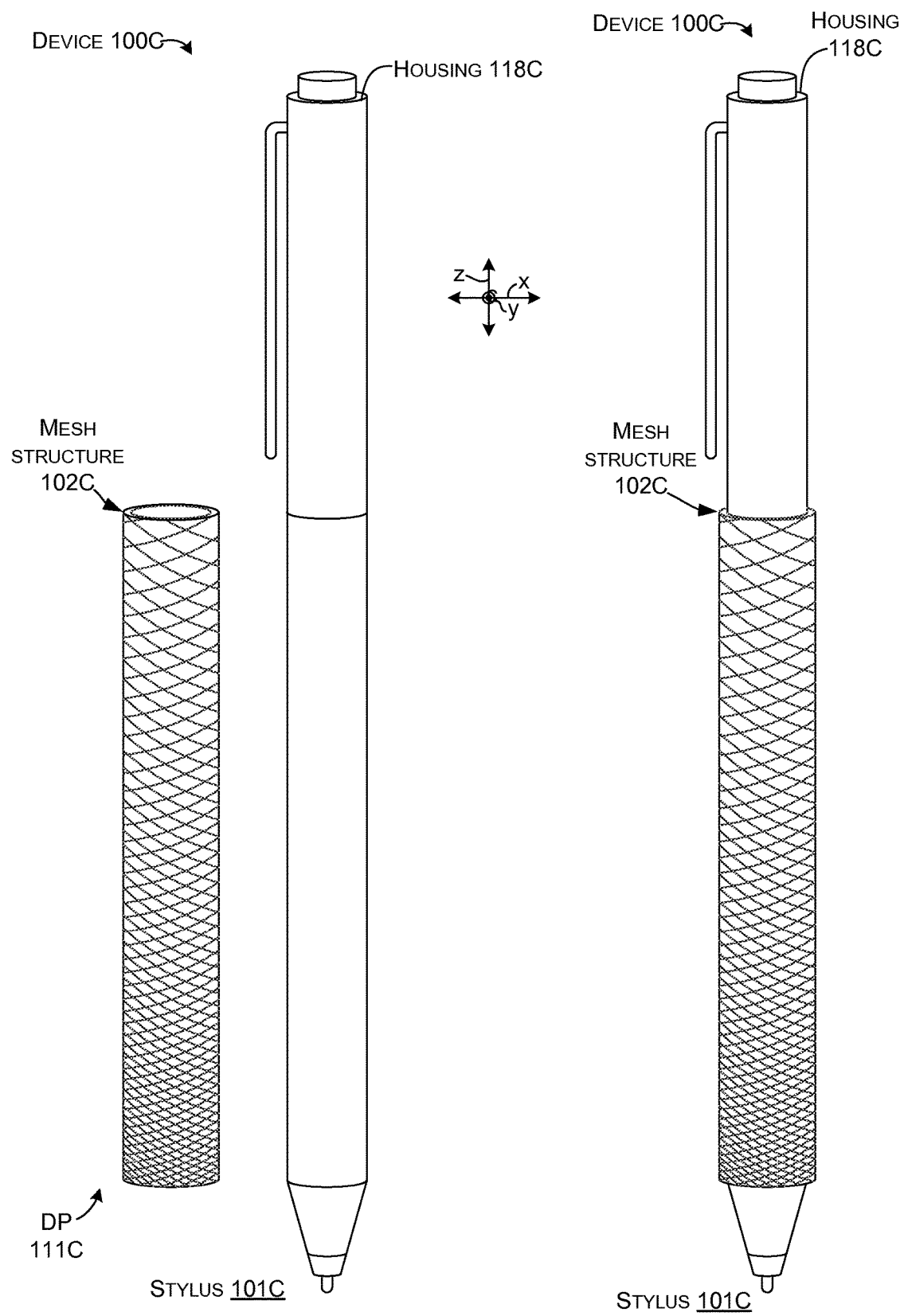

FIGS. 4A and 4B collectively show another example mesh structure 102C. In this case, the mesh structure can be added to an existing device 100C manifest as digital stylus 101C. The digital stylus 101C has a housing 118C. As seen in FIG. 4B, the mesh structure 102C can be added as a 'grip' or grip element over a portion of the housing to improve the 'feel,' 'aesthetics,' and/or 'balance' (e.g., center of mass) of the digital stylus 101C.

FIG. 5 shows another device 100D that employs mesh structure 102D. In this case the device 100D is manifest as a notebook computer 502 that includes a base portion 504, a display portion 506, and a hinge 508 that rotatably secures the base portion 504 and the display portion 506. For instance in this example, the base portion 504 and the display portion 506 are illustrated oriented in a deployed position at an oblique angle α relative to one another.

In this case, the device 100D includes a housing 118D. Mesh structure 102D forms part of the housing 118D (and/or is associated with the housing) on ends of the base portion 504 that are defined by the yz reference plane. In this configuration, the interstitial spaces 110D of the mesh structure 102D can facilitate ventilation of electronic components (not visible) of the base portion 504 while blocking foreign objects from entering the base portion. Further, the construction of the mesh structure 102D varies in the y reference direction so that the higher density 112D is away from the hinge 508 and the lower density 116D is proximate to the hinge. Stated another way, the density profile 111D of the mesh structure 102D increases as distance from the hinge 508 increases. In such a configuration, the high density of the mesh structure 102D away from the hinge can contribute to maintaining the notebook computer's center of mass within the base portion 504 when the display portion 506 is rotated to an oblique angle as in the illustrated configuration. Without this strategically positioned additional mass of the mesh structure 102D, electronic components 128D, such as display 510 in the display portion 506 may cause the notebook computer 502 to tip backwards when the display portion is oriented at an oblique angle relative to the base portion. However, this strategically positioned additional mass of the mesh structure 102D is not simply added weight to affect the center of mass. In this case, the mesh structure fulfills the additional role of a ventilation structure. As such, a single component, in this case the mesh structure 102D is a new type of component that can achieve two functions that would have traditionally been performed by two separate components.

Figure 6:
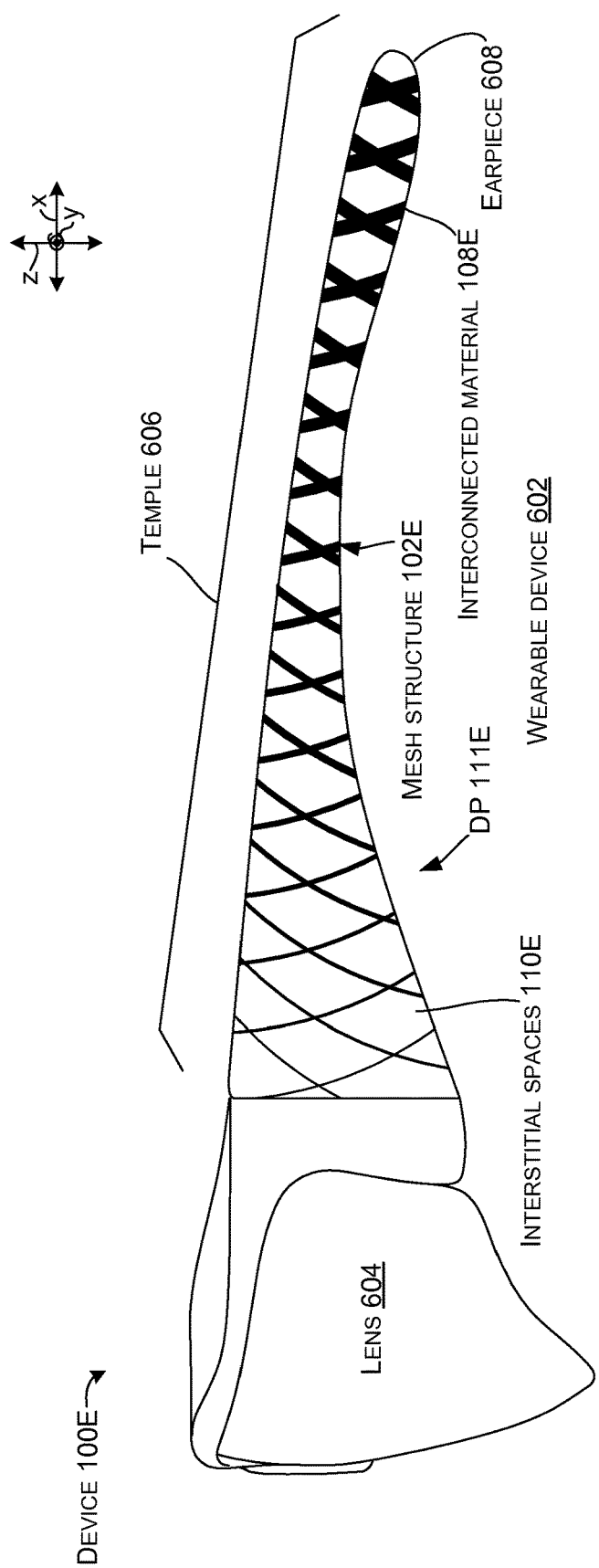

FIG. 6 shows another device 100E manifest as a wearable device 602. In this case the wearable device is a pair of eyeglasses or goggles. The wearable device 602 includes a lens 604 attached to a temple 606 that terminates in an earpiece 608. In this case, the temple 606 is formed by mesh structure 102E. Traditionally, glasses or goggles tend to have a center of mass very close to the lens 604 which makes them tip forward and thus reduces user comfort. This can be further exacerbated when electronic components, such as sensors and displays are positioned in or near the lens 604.

This aspect can be addressed by mesh structure 102E which can shift the center of mass of the glasses while keeping the overall weight of the glasses low. In this case, the mesh structure 102E has a higher density proximate to the earpiece 608 and a lower density proximate to the lens (e.g., density profile 111E increases as distance from lens increases). Viewed from another perspective, an average size of the interstitial spaces is larger at the lens end of the temple 606 than at the earpiece end. As such, the gradiated density profile of the mesh structure can shift the center of mass rearward from the lens 604 toward the earpiece 608 so that the glasses rest more comfortably on the user's head.

In this implementation, the mesh structure 102E can maintain a generally uniform pattern (e.g., the center to center distances of the interconnected material 108E is consistent throughout the mesh structure). However, in this case a thickness of the interconnected material 108E proximate to the earpiece 608 is greater than the decreasing thicknesses of the interconnected material toward the lens 604. Alternatively or additionally, an overall width (in the y reference direction) of the mesh structure 102E (e.g., temple) can be uniform along the temple or varied. For instance, increasing the width of the mesh structure 102E (e.g., temple) with increasing distance from the lens 604 can produce more weight at the earpiece 608 and can further change the center of mass of device 100E.

Figure 7:
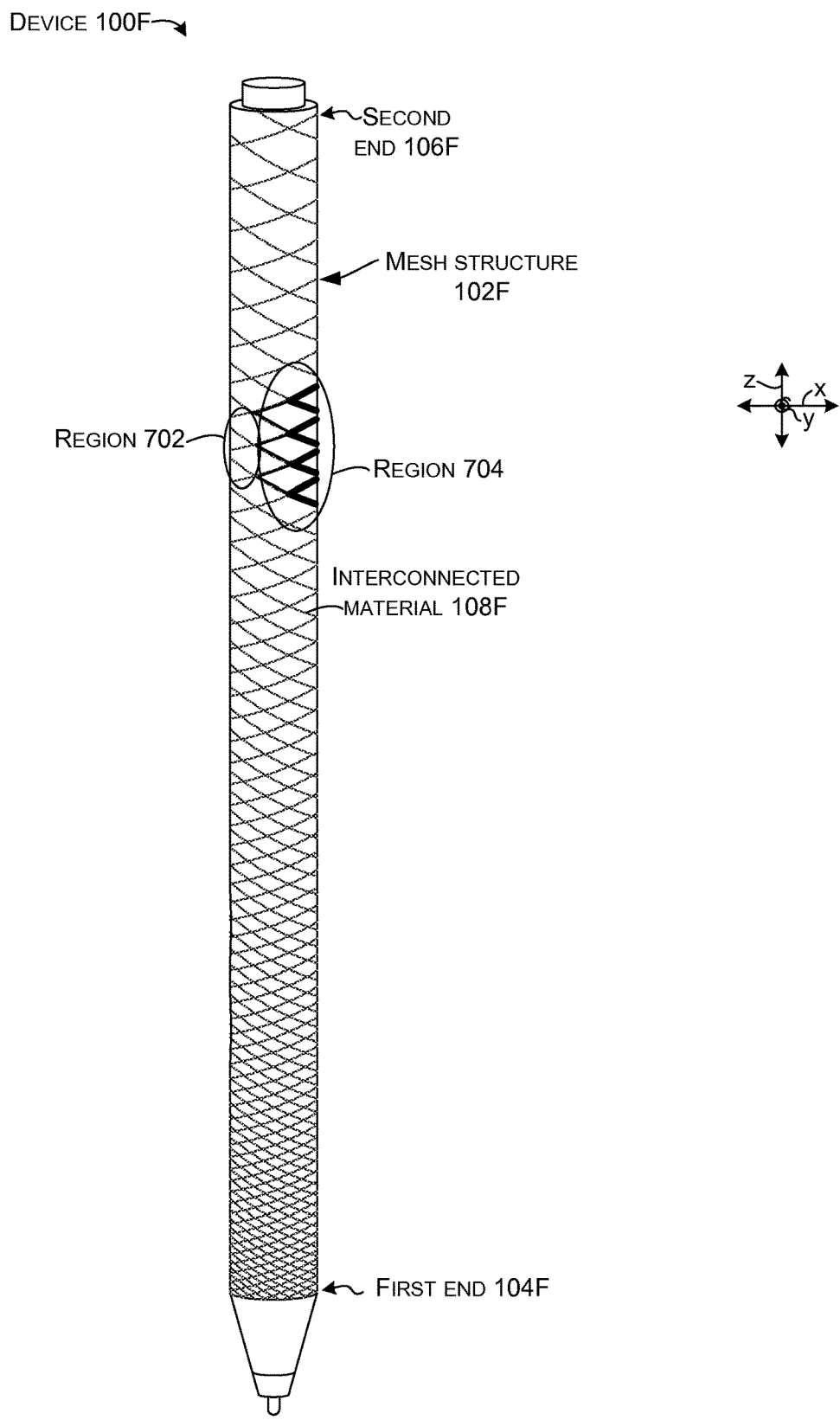

FIG. 7 shows another device 100F that employs interconnected material 108F in mesh structure 102F. Note that in this example, the interconnected material is gradiated (e.g., has a gradiated density profile 111F) from the first end 104F to the second end 106F (e.g., along the z reference axis). A portion of the interconnected material is also gradiated from side to side (e.g., along the x reference axis). For instance, a relatively heavy (e.g., massive) electronic component may be positioned within the device 100F underlying region 702. Balance of the device can be restored by counterbalancing this mass with higher density interconnected material 108F in region 704. Viewed from one perspective, the device can have a desired center of balance along a long axis extending from the first end 104F to the second end 106F. The massive weight may change the center of balance, but the center of balance can be restored by the heavier gradiated density of the interconnected material 108F in region 704. Accordingly, various implementations can vary the density of the mesh structure 102F in various geometric orientations. Further, the structure of the interconnected material can be varied in different ways. For instance, relative to device 100F, the pattern of the interconnected material expands from the first end to the second end to decrease density. In regions 702 and 704, density of the interconnected material changes by changing the thickness of the interconnected material while maintaining the same pattern along the x reference direction.

The mesh structure examples described above can be manufactured in various ways and from various materials. Notably, 3D printing can be used to manufacture the mesh structures. The 3D printed mesh structures can be directly incorporated into devices, or further processing, such as polishing, can be employed before incorporating the mesh structures into devices. Various materials can be utilized including plastics and/or metals. Examples of metals can include: stainless steel, Titanium, Aluminum, and/or other ferrous and non-ferrous metals.

FURTHER EXAMPLES

The above discussion relates to devices employing mesh structures and includes multiple examples and additional examples are described below. One example can include a mesh structure with a density profile varying from a first end of the mesh structure to a second end of the mesh structure.

Another example can include any combination of the above and/or below examples where the mesh structure is uniformly gradiated between the first end and the second end or non-uniformly gradiated between the first end and the second end.

Another example can include any combination of the above and/or below examples where the mesh structure comprises an interconnected material that defines interstitial spaces.

Another example can include any combination of the above and/or below examples where the mesh structure defines more interstitial spaces per unit area at the second end than at the first end or wherein a number of interstitial spaces is the same at the first end and the second end, or wherein an average size of the interstitial spaces is greater at the second end than at the first end.

Another example can include any combination of the above and/or below examples where the mesh structure comprises a housing of the device, or wherein the mesh structure comprises a portion of the housing of the device, or wherein the mesh structure comprises a grip element secured relative to the housing.

Another example can include any combination of the above and/or below examples where the mesh structure deflects under a torsional force of 5 Newtons (N).

Another example can include any combination of the above and/or below examples where the density profile is non-linear.

Another example can include any combination of the above and/or below examples where the device is a stylus and where the mesh structure comprises an elongate body of the stylus that extends from the first end to the second end.

Another example can include any combination of the above and/or below examples where the first end is proximate to a sensing tip of the stylus and wherein the first end is more dense than the second end.

Another example can include any combination of the above and/or below examples where the mesh structure approximates a portion of a tube and further comprises a pressure switch positioned inside the tube that is activatable when a user imparts a force that deflects a portion of the mesh structure overlying the pressure switch.

Another example can include any combination of the above and/or below examples where the pressure switch extends radially around the tube.

Another example can include any combination of the above and/or below examples where the mesh structure approximates a portion of a tube and further comprises electronic components positioned in the tube and wherein a first weight of the electronic components between a midpoint of the tube and the second end is greater than a second weight of the electronic components between the first end and the midpoint and where the density profile of the mesh structure causes a third weight of the mesh structure between the first end and the midpoint to be greater than a fourth weight between the midpoint and the second end.

Another example can include any combination of the above and/or below examples where a center of mass is between the midpoint and the first end.

Another example can include any combination of the above and/or below examples where the mesh structure approximates a portion of a housing.

Another example can include any combination of the above and/or below examples where the device comprises a notebook computer that can include a base portion, a display portion, and a hinge rotatably securing the base portion to the display portion. The base portion can comprise a housing. The mesh structure can comprise a portion of the housing. The density profile can increase from a first end of the mesh structure positioned proximate to the hinge to the second end of the mesh structure that is distal to the hinge.

Another example can include any combination of the above and/or below examples where the device comprises a wearable device.

Another example can include any combination of the above and/or below examples where the wearable device comprises eyeglasses and wherein the mesh structure comprises a temple of the eyeglasses and wherein the density profile is highest at an earpiece end of the temple.

Another example is manifest as a stylus that can include a mesh structure that extends along a length between a first end and a second end. A density of the mesh structure is greater at the first end than the second end. The stylus can also include a sensing tip secured relative to the first end of the mesh structure and electronic components positioned within the mesh structure and electrically coupled to the sensing tip.

Another example can include any combination of the above and/or below examples where the density of the mesh structure decreases uniformly along a gradient between the first end and the second end.

Another example can include any combination of the above and/or below examples where the mesh structure comprises a housing or wherein the mesh structure is secured relative to the housing.

Another example is manifest as a device that can include a housing and electronic components secured relative to the housing and that affect a center of mass of the device relative to the housing. The device can also include a mesh structure having a gradiated density secured relative to the housing in a manner that the gradiated density at least partially counteracts the affects of the electronic components on the center of mass.

Another example can include any combination of the above and/or below examples where the device is a stylus.

Another example can include any combination of the above and/or below examples where the device is a notebook computer and wherein the housing comprises a base portion rotatably secured to a display portion.

Another example can include any combination of the above and/or below examples where the electronic component comprises a display positioned in the display portion and the mesh structure comprises a ventilation structure of the base portion of the housing.

Another example can include any combination of the above and/or below examples where the mesh structure comprises a ventilation structure of the base portion. The gradiated density of the ventilation structure provides a higher density away from the display portion to maintain a center of mass of the device within the base portion when the display portion is rotated to a deployed position that forms an oblique angle relative to the base portion.

Another example can include any combination of the above and/or below examples where the device is a wearable device.

CONCLUSION

Although techniques, methods, devices, systems, etc., pertaining to devices employing mesh structures are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A device, comprising:
a mesh structure with a density profile varying from a first relatively dense end of the mesh structure to a second relatively sparse end of the mesh structure; and
a relatively heavy component that is distinct from the mesh structure and positioned proximate the second relatively sparse end of the mesh structure, the relatively heavy component being counterbalanced by the first relatively dense end of the mesh structure,
wherein the mesh structure defines more interstitial spaces per unit area at the second relatively sparse end than at the first relatively dense end, or
wherein an average size of the interstitial spaces is greater at the second relatively sparse end than at the first relatively dense end.

2. The device of claim 1, wherein the mesh structure comprises a housing of the device, or wherein the mesh structure comprises a portion of the housing of the device, or wherein the mesh structure comprises a grip element secured relative to the housing.

3. The device of claim 1, wherein the mesh structure deflects under a torsional force of 5 Newtons (N).

4. The device of claim 1, wherein the density profile is non-linear.

5. The device of claim 1, wherein the device is a stylus and wherein the mesh structure comprises an elongate body of the stylus that extends from the first relatively dense end to the second relatively sparse end.

6. The device of claim 5, wherein the first relatively dense end is proximate to a sensing tip of the stylus.

7. The device of claim 1, wherein the mesh structure approximates a portion of a tube and further comprises a pressure switch positioned inside the tube that is activatable when a user imparts a force that deflects a portion of the mesh structure overlying the pressure switch.

8. The device of claim 7, wherein the pressure switch extends radially around the tube.

9. The device of claim 1, embodied as a stylus further comprising a sensing tip.

10. The device of claim 1, the mesh structure comprising interlaced plastic.

11. The device of claim 1, the mesh structure comprising interlaced metal.

12. The device of claim 1, the mesh structure forming triangular shapes, the interstitial spaces being defined by the triangular shapes.

13. The device of claim 1, the mess structure forming a truss.

14. A device, comprising:
a mesh tube with a density profile varying from a relatively dense end of the mesh tube to a relatively sparse end of the mesh tube; and
electronic components positioned inside the mesh tube proximate the relatively sparse end of the mesh tube and away from the relatively dense end of the mesh tube, and
wherein the electronic components are counterbalanced by the relatively dense end of the mesh tube positioned away from the electronic components.

15. The device of claim 14, having a center of mass between a midpoint of the mesh tube and the relatively dense end of the mesh tube.

16. The device of claim 14, embodied as a stylus.

17. A notebook computer, comprising:
a base portion;
a display portion; and
a hinge rotatably securing the base portion to the display portion,
the base portion comprising a housing with a mesh structure with a density profile varying from a relatively dense end of the mesh structure to a relatively sparse end of the mesh structure, and
wherein the relatively sparse end of the mesh structure is positioned proximate to the hinge and the relatively dense end of the mesh structure is positioned distal from the hinge.

18. A stylus, comprising:
a mesh tube having a relatively dense end and a relatively sparse end;
a sensing tip secured relative to the relatively dense end of the mesh tube; and,
one or more electronic components positioned within the mesh tube and electrically coupled to the sensing tip,
wherein at least one of the one or more electronic components is positioned proximate the relatively sparse end of the mesh tube.

19. The stylus of claim 18, wherein the density of the mesh tube decreases uniformly along a gradient between the relatively dense end and the relatively sparse end.

20. The stylus of claim 18, wherein the at least one of the electronic components that is positioned proximate the relatively sparse end of the mesh tube comprises a battery.

21. Eyeglasses comprising:
a mesh temple with a density profile varying from a relatively dense earpiece end of the mesh temple to a relatively sparse lens end of the mesh temple; and
a sensor or display,
wherein the mesh temple comprises more interstitial spaces per unit area at the relatively sparse lens end than at the relatively dense earpiece end, or
wherein an average size of the interstitial spaces is greater at the relatively sparse lens end than at the relatively dense earpiece end.

22. The eyeglasses of claim 21, further comprising a lens, the sensor or display being positioned in or near the lens.

* * * * *